(12) United States Patent
Nishimura et al.

(10) Patent No.: US 9,127,768 B2
(45) Date of Patent: Sep. 8, 2015

(54) GASKET FOR CYLINDER HEAD

(75) Inventors: Keisuke Nishimura, Kariya (JP);
Tatsuo Shimakawa, Kariya (JP);
Yoshinori Kodera, Kariya (JP); Kisho Yasuda, Tokyo (JP)

(73) Assignees: KABUSHIKI KAISHA TOYOTA JIDOSHOKKI, Aichi-ken (JP);
TOYOTA JIDOSHA KABUSHIKI KAISHA, Aichi-ken (JP); ISHIKAWA GASKET CO., LTD., Tokyo (JP)

( * ) Notice: Subject to any disclaimer, the term of this patent is extended or adjusted under 35 U.S.C. 154(b) by 781 days.

(21) Appl. No.: 12/984,388

(22) Filed: Jan. 4, 2011

(65) Prior Publication Data

US 2011/0163508 A1 Jul. 7, 2011

(30) Foreign Application Priority Data

Jan. 7, 2010 (JP) .................. 2010-002252

(51) Int. Cl.
*F16J 15/08* (2006.01)

(52) U.S. Cl.
CPC ........ *F16J 15/0825* (2013.01); *F16J 2015/085* (2013.01)

(58) Field of Classification Search
USPC .......................... 277/594, 595, 596
See application file for complete search history.

(56) References Cited

U.S. PATENT DOCUMENTS

| 4,213,620 A * | 7/1980 | Kennedy et al. ............ 277/596 |
| 5,551,709 A * | 9/1996 | Plunkett ........................ 277/592 |
| 5,601,292 A * | 2/1997 | Tanaka et al. ................. 277/593 |
| 5,794,945 A * | 8/1998 | Kubouchi et al. ............ 277/593 |
| 5,951,021 A * | 9/1999 | Ueta ............................. 277/593 |
| 6,027,124 A * | 2/2000 | Ishida et al. .................. 277/595 |
| 6,142,482 A * | 11/2000 | Goto et al. .................... 277/591 |
| 6,237,557 B1 * | 5/2001 | Wiegert ..................... 123/193.5 |
| 6,406,032 B1 * | 6/2002 | Miyaoh ......................... 277/594 |
| 6,431,554 B1 * | 8/2002 | Miyamoto et al. ............ 277/593 |
| 6,517,084 B2 * | 2/2003 | Inamura ........................ 277/592 |
| 6,641,142 B2 * | 11/2003 | Hegmann et al. ............. 277/594 |
| 6,676,133 B2 * | 1/2004 | Obermaier et al. ........... 277/593 |
| 6,698,765 B2 * | 3/2004 | Isogai ........................... 277/595 |
| 6,705,619 B2 * | 3/2004 | Miyaoh ......................... 277/594 |
| 6,827,352 B2 * | 12/2004 | Ueta et al. .................... 277/593 |
| 7,152,571 B1 * | 12/2006 | Wilson et al. ............. 123/196 R |

(Continued)

FOREIGN PATENT DOCUMENTS

EP 1 577 589 A1 9/2005
JP 57-193949 U 12/1982

(Continued)

OTHER PUBLICATIONS

European Search Report dated Apr. 4, 2011 issued in corresponding European Patent Application No. 10197285.9.

*Primary Examiner* — Vishal Patel
*Assistant Examiner* — L. Susmitha Koneru
(74) *Attorney, Agent, or Firm* — Sughrue Mion, PLLC

(57) ABSTRACT

A gasket for arrangement between a cylinder block and cylinder head of an internal combustion engine. The gasket includes a lubricant hole through which lubricant is supplied to the cylinder head. A high pressure bead extends around the lubricant hole. A low pressure bead is extends around the high pressure bead and at least partially extends around a hollow portion, which is in communication with a lubricant reservoir of the engine, when the gasket is arranged between the cylinder block and the cylinder head.

8 Claims, 3 Drawing Sheets

(56) References Cited

U.S. PATENT DOCUMENTS

| | | | |
|---|---|---|---|
| 7,204,491 B2* | 4/2007 | Hatamura et al. | 277/593 |
| 7,913,386 B2* | 3/2011 | Werz et al. | 29/888.3 |
| 8,261,702 B2* | 9/2012 | Fedeson et al. | 123/41.82 R |
| 8,459,657 B2* | 6/2013 | Ueta et al. | 277/594 |
| 8,496,253 B2* | 7/2013 | Goettler et al. | 277/594 |
| 2001/0006279 A1* | 7/2001 | Sugimoto et al. | 277/595 |
| 2001/0017446 A1* | 8/2001 | Jinno | 277/594 |
| 2001/0024018 A1* | 9/2001 | Teranishi et al. | 277/594 |
| 2001/0026045 A1* | 10/2001 | Hiramatsu et al. | 277/591 |
| 2001/0026047 A1* | 10/2001 | Uemura et al. | 277/594 |
| 2002/0027327 A1* | 3/2002 | Sugimoto et al. | 277/592 |
| 2002/0117812 A1* | 8/2002 | Mori et al. | 277/591 |
| 2002/0180161 A1* | 12/2002 | Werz et al. | 277/594 |
| 2004/0124588 A1* | 7/2004 | Stapel et al. | 277/595 |
| 2004/0155412 A1* | 8/2004 | Ueta et al. | 277/594 |
| 2004/0239042 A1 | 12/2004 | Stecher et al. | |
| 2005/0132998 A1 | 6/2005 | Gorgas et al. | |
| 2005/0206091 A1* | 9/2005 | Detmann et al. | 277/594 |
| 2006/0097460 A1* | 5/2006 | Udagawa et al. | 277/595 |
| 2006/0138731 A1* | 6/2006 | Stetter et al. | 277/594 |
| 2007/0013145 A1 | 1/2007 | Detmann et al. | |
| 2007/0102887 A1* | 5/2007 | Sandford | 277/598 |
| 2009/0033039 A1 | 2/2009 | Anderson et al. | |
| 2009/0088315 A1* | 4/2009 | Seki et al. | 501/139 |
| 2012/0175847 A1* | 7/2012 | Popielas et al. | 277/592 |
| 2013/0193651 A1* | 8/2013 | Fracz et al. | 277/593 |

FOREIGN PATENT DOCUMENTS

| | | |
|---|---|---|
| JP | 3-46070 U | 4/1991 |
| JP | 04-064776 A | 2/1992 |
| JP | 08-285080 A | 11/1996 |
| JP | 11-270684 A | 10/1999 |
| JP | 2000-220740 A | 8/2000 |
| JP | 2003-035363 A | 2/2003 |
| JP | 2006-046566 A | 2/2006 |

* cited by examiner

GASKET FOR CYLINDER HEAD

BACKGROUND OF THE INVENTION

The present invention relates to a gasket for a cylinder head and, more particularly, to a gasket arranged between a cylinder block and cylinder head of an internal combustion engine.

An internal combustion engine includes a cylinder block and a cylinder head, which are fastened together by bolts. A gasket is arranged between the cylinder block and cylinder head to seal the engine against the escape of fluids, such as combustion gas, oil (lubricant), and coolant. Holes are formed in the gasket at predetermined locations to allow for the passage of the combustion gas, oil, coolant, and bolts. Various types of sealing beads are formed around the holes (refer, for example, to Japanese Laid-Open Patent Publication Nos. 4-64776, 2000-220740, and 8-285080). The beads are each formed to produce a sealing pressure that differs in accordance with the subject it seals when the gasket is fastened by the bolts. For example, a high pressure bead having a high sealing pressure is used as the bead that seals the rim of a hole (lubricant hole) through which lubricant passes from the cylinder block to the cylinder head. A low pressure bead having a low sealing pressure is used as the bead that seals the rim of a bolt hole.

The gasket uses a high pressure bead to seal a lubricant hole. Nevertheless, the gasket, which is exposed to high pressure oil and used under harsh conditions, is susceptible to wear and deterioration. When such wear or deterioration occurs, lubricant may escape from the high pressure bead, move through a gap formed between the gasket and cylinder head, and ooze out of the engine.

SUMMARY OF THE INVENTION

The present invention provides a gasket for a cylinder head that reduces the amount of lubricant that oozes out of the engine.

One aspect of the present invention is a gasket for arrangement between a cylinder block and cylinder head of an internal combustion engine and including a lubricant hole through which lubricant is supplied to the cylinder head. The gasket includes a high pressure bead extending around the lubricant hole. A low pressure bead extends around the high pressure bead and at least partially extends around a hollow portion, which is in communication with a lubricant reservoir of the engine, when the gasket is arranged between the cylinder block and the cylinder head.

A further aspect of the present invention is a gasket for arrangement between a cylinder block and cylinder head of an internal combustion engine and including a lubricant hole through which lubricant is supplied to the cylinder head. The gasket includes a high pressure bead extending around the lubricant hole. A low pressure bead includes a first portion and a second portion. The first portion extends around the high pressure bead from a side opposite to a hollow portion that is in communication with a lubricant reservoir of the engine. The second portion extends along an edge of the gasket that faces toward the hollow portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be discussed with reference to FIGS. 1A to 4.

Figure 1A:
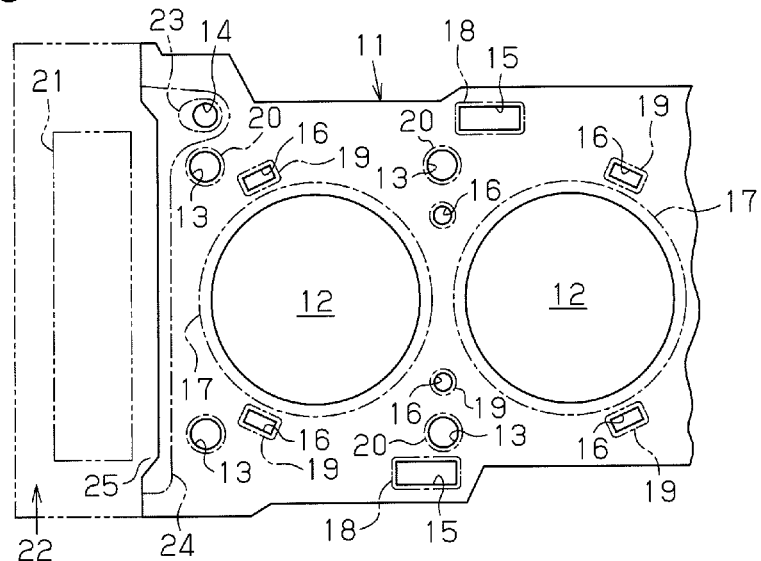
FIG. 1A is a plan view showing part of a cylinder head gasket according to one embodiment of the present invention.
Figure 1B:
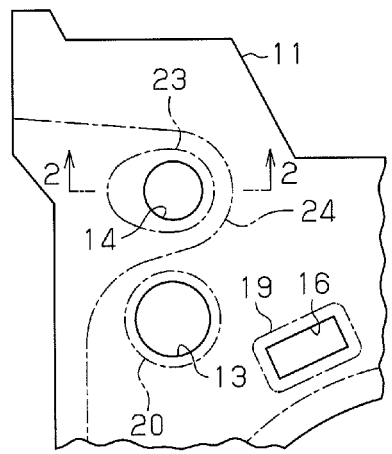
FIG. 1B is a partially enlarged view of FIG. 1A.

Referring to FIGS. 1A and 1B, a gasket 11 for a cylinder head includes a plurality of cylinder bore holes 12, which are arranged at predetermined intervals in the longitudinal direction of the gasket 11. In addition to the cylinder bore holes 12, the gasket 11 includes bolt holes 13, a lubricant hole 14, lubricant recovery holes 15, and coolant holes 16. When the gasket 11 is arranged between a cylinder block and the cylinder head, bolts are inserted through the bolt holes 13 to fasten the cylinder block and cylinder head. Lubricant (engine oil) is supplied from the cylinder block to the cylinder head through the lubricant hole 14. The lubricant returns from the cylinder head to an oil pan, which serves as a lubricant reservoir, through the lubricant recovery holes 15. Engine coolant flows between the cylinder block and the cylinder head through coolant holes 16. In the present embodiment, there is a single lubricant hole 14 and a plurality of the lubricant recovery holes 15 and coolant holes 16.

Figure 2:
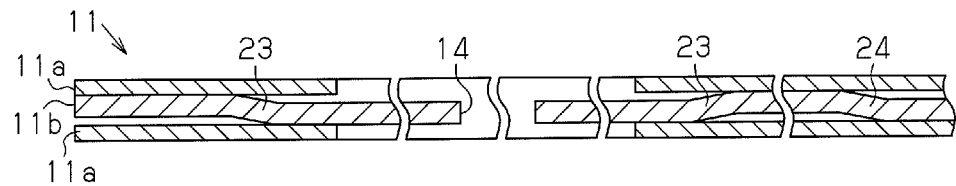
FIG. 2 is an enlarged schematic cross-sectional view taken along line 2-2 in FIG. 1B.

As shown in FIG. 2, the gasket 11 is formed by superimposing two base plates 11a and one sub-plate 11b, which is arranged between the two base plates 11a. The two base plates 11a and the sub-plate 11b are each formed from a resilient metal thin plate, such as a stainless steel sheet used for springs. Beads are formed in the sub-plate 11b.

An annular bead 17, which is used as a combustion gas seal, is formed around each cylinder bore hole 12. A bead 18, which is used as a lubricant seal, is formed around each lubricant recovery hole 15. A bead 19, which is used as a coolant seal, is formed around each coolant hole 16. A bead 20, which is used as a seal, is formed around each bolt hole 13. Each of the beads 17 to 20 is a full bead. In FIGS. 1A and 1B, the beads 17 to 20 are each shown by a single-dashed line.

The gasket 11 has a first end in the longitudinal direction. The first end faces toward an accommodation chamber 22, which accommodates a timing train 21 of the engine. The lubricant hole 14 is formed at one corner in the first end of the gasket 11. A high pressure bead 23 is formed around the lubricant hole 14. The timing train refers to a power transmission system that transmits the rotation of a crankshaft to a mechanism for driving engine valves. For example, the timing train may be a link-type power transmission mechanism, which uses a timing chain or timing belt to transmit power, or a gear-type power transmission mechanism, which uses gears to transmit power.

A low pressure bead 24 is also formed on the first end of the gasket 11 to seal the accommodation chamber 22 so that lubricant does not escape out of the accommodation chamber 22. The low pressure bead 24 at least partially extends around a hollow portion 25, which is part of the accommodation chamber 22. The low pressure bead 24 also extends around the high pressure bead 23. The hollow portion 25 extends along the side (edge) of the gasket facing toward the accommodation chamber 22 and lies between the engine body and the timing train 21, as shown in FIG. 1A. The low pressure bead 24 includes a first portion (curved portion), which corresponds to the lubricant hole 14, and a second portion, which is the remaining part. The first portion is curved so that the high pressure bead 23 is arranged between the low pressure bead 24 and the hollow portion 25. In other words, the first portion extends around the high pressure bead 23 from the side opposite to the hollow portion 25. The second portion extends along the hollow portion 25, that is, along the edge of the gasket 11 facing toward the hollow portion 25.

Figure 3:
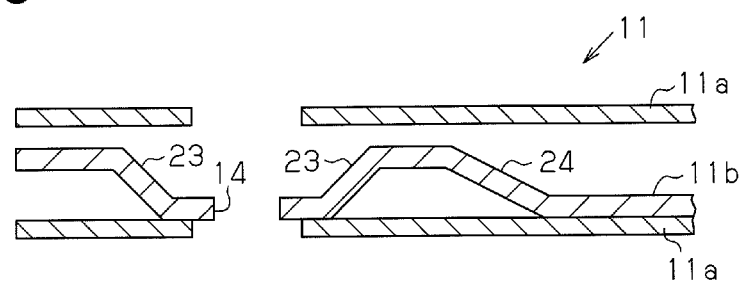
FIG. 3 is a schematic cross-sectional view showing the difference between a low pressure bead and a high pressure bead.

The high pressure bead 23 and the low pressure bead 24 are each shown by a single-dashed line and each formed by a half bead. A half bead is formed by a slope (inclined surface) in the sub-plate 11b. When the gasket 11 is fastened between the cylinder block and cylinder head, the high pressure bead 23 produces high sealing pressure while the low pressure bead 24 produces low sealing pressure. The sealing pressure differs depending on the inclination angle of the half bead when the gasket 11 is removed from the cylinder block as shown in the state of FIG. 3. In this state, the high pressure bead 23 has a greater inclination than the low pressure bead 24. The inclination angles of the high pressure bead 23 and the low pressure bead 24 are set to obtain desired planar pressures for the high pressure bead 23 and the low pressure bead 24.

The operation of the gasket 11 will now be described. The gasket 11 is held between the cylinder block and cylinder head, which are fastened together by bolts. When the gasket 11 is held between the cylinder block and cylinder head, the planar pressures of the beads 17 to 19, the high pressure bead 23, and the low pressure bead 24 relative to the cylinder head increases. This ensures sealing of the gasket 11.

Figure 4A:
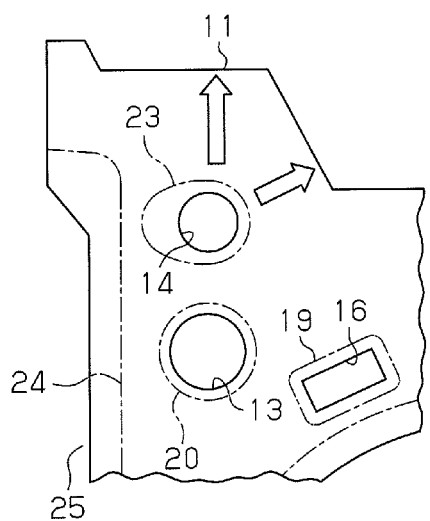
FIG. 4A is a schematic diagram showing the movement of lubricant that escapes a high pressure bead in a gasket having a low pressure bead extending along a chamber.
Figure 4B:
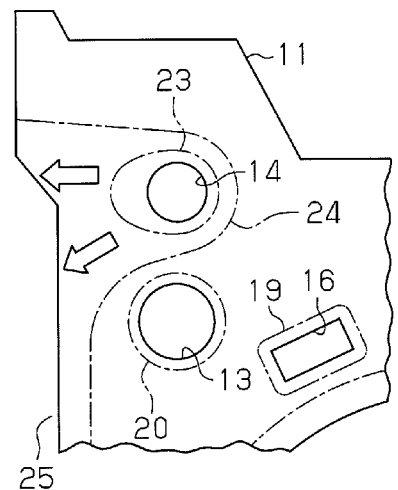
FIG. 4B is a schematic diagram showing the movement of lubricant that escapes a high pressure bead in a gasket having a low pressure bead surrounding the high pressure bead.

The gasket 11, which is used under harsh conditions, is susceptible to wear and deterioration. When such wear or deterioration occurs, some of the high pressure lubricant passing through the lubricant hole 14 escapes from the high pressure bead 23. In such a case, if the gasket 11 were to have the low pressure bead 24 formed to extend only along the hollow portion 25 as shown in FIG. 4A, the lubricant that escapes from the high pressure bead 23 would move along the upper surface of the gasket 11 as shown by the arrows and ooze out of the engine. In this embodiment, however, the low pressure bead 24 is formed to extend around the high pressure bead 23 and at least part of the hollow portion 25. As a result, even when lubricant escapes the high pressure bead 23 and moves along the upper surface of the gasket 11, less lubricant oozes out of the engine. Further, as shown in FIG. 4B, the lubricant that escapes the high pressure bead 23 moves along the upper surface of the gasket 11 as shown by the arrows pointing toward the hollow portion 25. The lubricant enters the accommodation chamber 22, which accommodates the timing train 21, from the edge of the gasket 11 and then returns to the oil pan.

This embodiment has the advantages described below.

(1) The gasket 11 includes the high pressure bead 23, which extends around the lubricant hole 14 that supplies lubricant to the cylinder head, and the low pressure bead 24, which extends around the hollow portion 25 and the high pressure bead 23. Accordingly, in a state in which the gasket 11 is fastened between the cylinder block and the cylinder head, when lubricant escapes from the high pressure bead 23, which surrounds the lubricant hole 14, the low pressure bead 24, which extends around the high pressure bead 23, reduces the amount of lubricant that oozes out of the engine.

(2) The low pressure bead 24 seals the accommodation chamber 22, which accommodates the timing train 21 of the engine, so as to prevent lubricant from escaping the accommodation chamber 22. The lubricant that escapes the high pressure bead 23, which extends around the lubricant hole 14, enters the accommodation chamber 22, which accommodates the timing train 21, and returns to the oil pan. This reduces the amount of oil that is lost.

(3) The lubricant hole 14 is formed in the gasket 11 at a corner in the side facing toward the accommodation chamber 22, which accommodates the timing train 21. This shortens the distance from the curved portion of the low pressure bead 24, which is curved to surround the high pressure bead 23, to the hollow portion 25 compared to when the lubricant hole 14 is formed at the longitudinally middle part of the gasket 11. Thus, the lubricant that escapes the high pressure bead 23 easily returns to the oil pan via the accommodation chamber 22.

It should be apparent to those skilled in the art that the present invention may be embodied in many other specific forms without departing from the spirit or scope of the invention. Particularly, it should be understood that the present invention may be embodied in the following forms.

Figure 5:
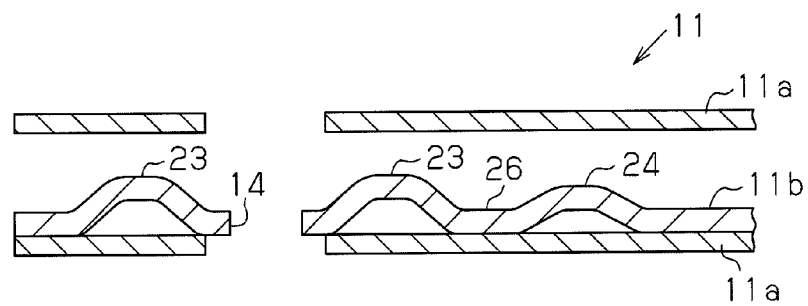
FIG. 5 is a schematic cross-sectional diagram showing the difference between a low pressure bead and a high pressure bead in a further embodiment of the present invention.

Referring to FIG. 5, the low pressure bead 24 and the high pressure bead 23 may be full beads. The sealing pressure of a full bead differs in accordance with the ridge height of a bead in a state in which the gasket 11 is removed from the cylinder block. The ridge of the high pressure bead 23 is higher than the ridge of the low pressure bead 24. The ridge height of each bead is set so that the high pressure bead 23 has the desired planar pressure and the low pressure bead 24 has the desired planar pressure. A flat portion 26 is arranged at a location where the low pressure bead 24 and the high pressure bead 23 are close to each other. Such a structure obtains the same advantages as the embodiment discussed above. Instead of arranging the flat portion 26 at a location where the low pressure bead 24 and the high pressure bead 23 are close to each other, the ridge of the low pressure bead 24 and the ridge of the high pressure bead 23 may be formed to be continuous with each other. However, in such a case, it would be difficult to form the low pressure bead 24 and the high pressure bead 23 with the desired heights. The arrangement of the flat portion 26 between the low pressure bead 24 and the high pressure bead 23 allows for the low pressure bead 24 and the high pressure bead 23 to be easily formed with the desired height.

Figure 6:
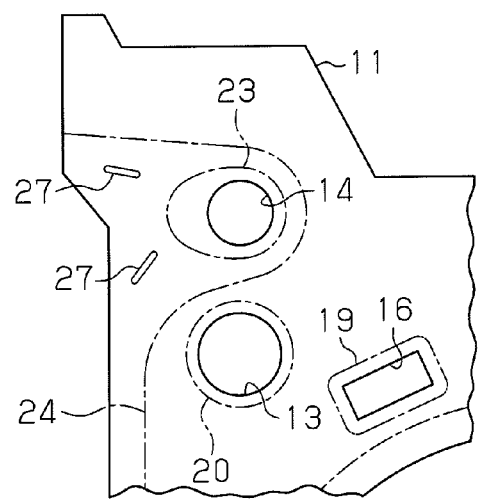
FIG. 6 is a plan view showing part of a gasket according to another embodiment of the present invention.

As shown in FIG. 6, planar pressure adjustment beads 27 may be formed in a portion which the low pressure bead 24 extends around. The planar pressure adjustment bead 27 is formed to have the same cross-sectional shape as the low pressure bead 24. The low pressure bead 24 is not a closed loop and is open toward the hollow portion 25. Thus, depending on the shape and area of the low pressure bead 24, planar pressure may be unevenly applied to the low pressure bead 24 or high pressure bead 23 when the gasket 11 is fastened between the cylinder block and cylinder head. However, the planar pressure adjustment beads 27 on the gasket 11 equally adjusts the planar pressures applied to the low pressure bead 24 and the high pressure bead 23.

The bead that extends around the high pressure bead 23 for the lubricant hole 14 is not limited to the low pressure bead 24 and may be a bead that extends around a portion that is in communication with the lubricant reservoir of the engine when the gasket 11 is in a state of use. For example, the bead 18 that surrounds the lubricant recovery hole 15 may be formed to also extend around the high pressure bead 23. In such a case, the lubricant that escapes the high pressure bead 23, which surrounds the lubricant hole 14, reduces the amount of lubricant that oozes out of the engine and returns the lubricant to the oil pan from the lubricant recovery hole 15.

Instead of forming the lubricant hole 14 in a corner at the side of the gasket 11 facing toward the accommodation chamber 22, which accommodates the timing train 21, the lubricant hole 14 may be formed in the longitudinally middle part of the gasket 11.

The beads 20 for the bolt holes 13 and the beads 19 for the coolant holes 16 may be half beads (inclined surfaces) instead of full beads. Further, the beads 20 for the bolt holes 13 may be eliminated.

The gasket 11 does not have to be formed by three resilient metal thin plates. For example, the gasket 11 may be formed from a single resilient metal thin plate. Further, the gasket 11 may be formed from a first metal plate, which surrounds the rim of each cylinder bore hole 12 and has a suitable width, and a second metal plate, which forms the remaining part of the gasket 11. In this case, the second metal plate is thinner and harder than the first metal plate, and the first and second metal plates are laser-welded to form the gasket 11.

The gasket 11 may be formed by a metal base plate and a rubber layer. The metal base plate include holes, such as the cylinder bore holes 12, the lubricant hole 14, the lubricant recovery hole 15, and the coolant holes 16. The rubber layer, which is formed from foamed rubber, covers the surface of the base plate. In this case, the rim of each hole in the rubber layer is formed as non-bubble portion in which bubbles are squeezed out from the rubber layer.

The gasket 11 is not limited to use for an open deck type cylinder block and may also be applied to a closed deck type cylinder block.

The present examples and embodiments are to be considered as illustrative and not restrictive, and the invention is not to be limited to the details given herein, but may be modified within the scope and equivalence of the appended claims.

What is claimed is:

1. A gasket configured to be arranged between a cylinder block and cylinder head of an internal combustion engine, the gasket comprising:
    a lubricant hole configured to supply lubricant to the cylinder head;
    a high pressure bead extending around the lubricant hole; and
    a low pressure bead extending around the high pressure bead and starting from a side edge of the gasket, which is configured to face toward an accommodation chamber of a timing train of the engine when the gasket is arranged between the cylinder block and the cylinder head,
    the high pressure bead is configured to be disposed inside an area completely enclosed by the low pressure bead and the side edge of the gasket.

2. The gasket according to claim 1, wherein the low pressure bead is configured to seal the accommodation chamber against the escape of lubricant from the accommodation chamber.

3. The gasket according to claim 1, wherein the lubricant hole is formed in a corner of the gasket adjacent the side edge of the gasket.

4. The gasket according to claim 1, wherein the low pressure bead includes a first portion, which extends around the high pressure bead from a side opposite to the side edge of the gasket, and a second portion, which extends along the side edge of the gasket.

5. The gasket according to claim 1, further comprising:
    a flat portion arranged between the low pressure bead and the high pressure bead.

6. A gasket configured to be disposed between a cylinder block and cylinder head of an internal combustion engine, the gasket comprising:
    a lubricant hole through which lubricant is supplied to the cylinder head;
    a side edge configured to face a lubricant reservoir of an engine when the gasket is disposed between the cylinder block and the cylinder head;
    a high pressure bead extending around the lubricant hole; and
    a low pressure bead starting from the side edge and including a first portion and a second portion, wherein the first portion extends around the high pressure bead from a side opposite to the side edge of the gasket, and the second portion extends from the first portion and along the side edge of the gasket,
    wherein the high pressure bead is disposed inside an area completely enclosed by the low pressure bead and the side edge.

7. A gasket configured to be arranged between a cylinder block and cylinder head of an internal combustion engine the gasket comprising:
    a lubricant hole configured to supply lubricant to the cylinder head;
    a high pressure bead extending around the lubricant hole; and
    a low pressure bead extending around the high pressure bead and extending from a side edge of the gasket, which is configured to face toward an accommodation chamber of a timing train of the engine when the gasket is arranged between the cylinder block and the cylinder head,
    the high pressure bead is configured to be disposed inside an area surrounded by the low pressure bead and the side edge of the gasket,
    wherein the high pressure bead and the low pressure bead are each formed as a half bead having an inclined surface, wherein an inclination angle of the inclined surface of the high pressure bead is greater than an inclination angle of the inclined surface of the low pressure bead.

8. The gasket according to claim 1, wherein the high pressure bead and the low pressure bead are each formed as a full bead having a ridge height, wherein the ridge height of the high pressure bead is higher than the ridge height of the low pressure bead.

* * * * *